ated an.
UNITED STATES PATENT OFFICE.

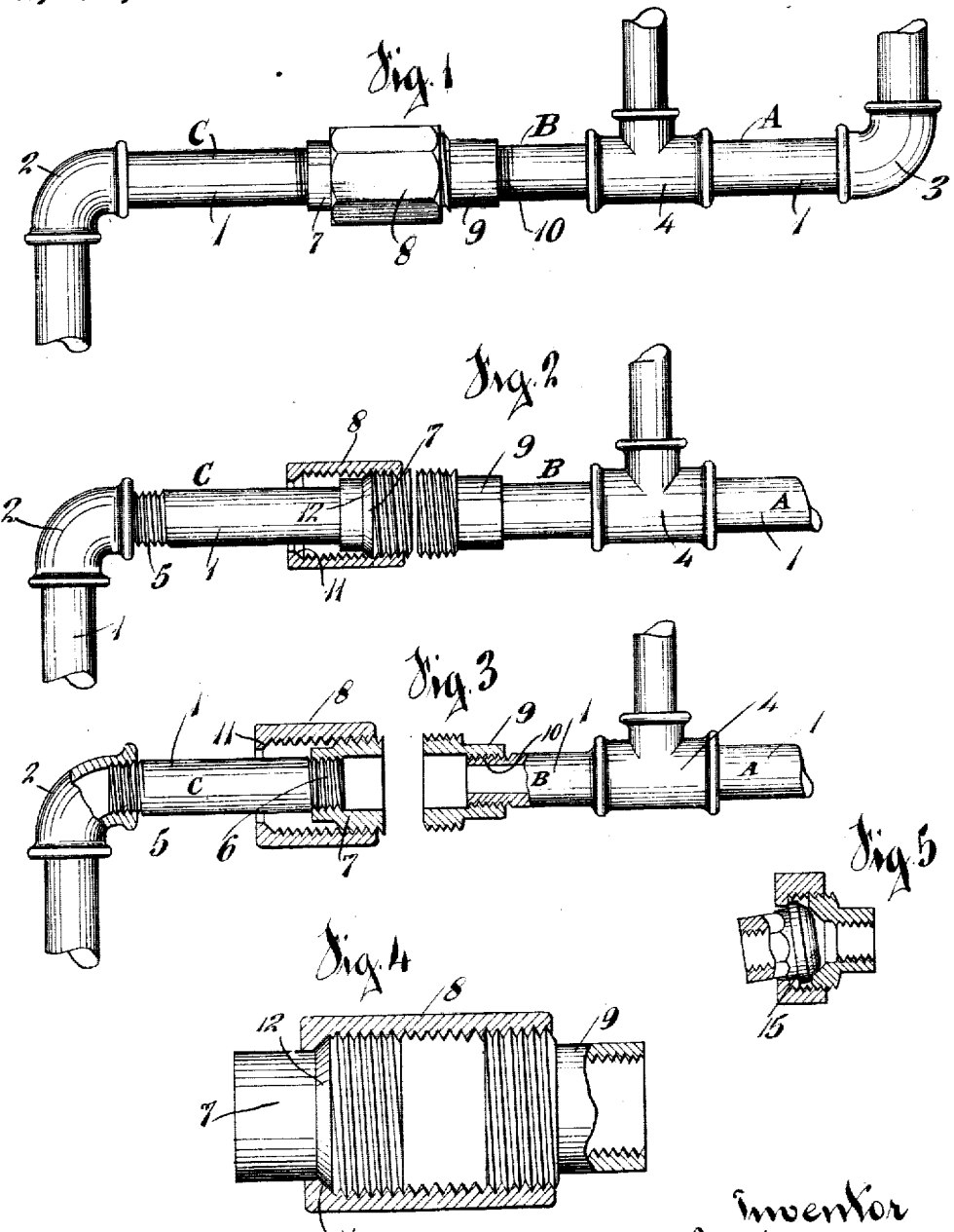

JOHN J. DELEHANTY, OF NORWOOD, OHIO.

RIGID PIPE-UNION.

1,270,021.

Specification of Letters Patent.

Patented June 18, 1918.

Application filed January 31, 1914. Serial No. 615,606.

*To all whom it may concern:*

Be it known that I, JOHN J. DELEHANTY, a citizen of the United States, residing at Norwood, in the county of Hamilton and State of Ohio, have invented certain new and useful Improvements in Rigid Pipe-Unions, of which the following is a specification.

My invention relates to rigid pipe unions and has as its object to provide a rigid pipe union of simple construction that can be easily placed in a pipe to tie two ends of said pipe together, whether said pipes are in position or not, without necessitating the springing of either end of the pipes to make proper connections.

In the pipe fitting art it is the practice of fitters when placing an ordinary flexible union or right and left coupling, etc., in a pipe, after the pipe has been cut and placed in position for putting a T or elbow therein, to spring the pipes out of place and then put on a right and left coupling, etc., or a union which is slightly flexible, screwing same up tight and gradually drawing the pipe back into position. The springing of the pipe for inserting a flexible union or right and left coupling, etc., is a difficult job especially when the fittings such as a T, L, etc., have been placed without any means of springing, which occurs very frequently.

My invention overcomes this disadvantage in pipe fitting and renders it an easy task to insert the union for connections whether a desired fitting has to be placed or not. In other words, it simplifies greatly the tying in of two ends of pipes and makes a strong, durable, and efficient joint, and one which is rigid and not likely to look as the ordinary flexible ones do.

My invention consists in providing threaded coupling sleeves mounted on two threaded coupling members or threaded terminal unions, one of these threaded coupling members being placed on the free ends of the pipes to be joined and being maintained in alinement and fastened together by means of the sleeve which has a ground joint at one end which engages a ground surface on the coupling at the corresponding end.

In the accompanying sheet of drawings which shows a preferred construction:

Figure 1 is a view of a pipe, supposed to be in place or in use, and showing my improved union in place after the T fitting has been placed therein.

Fig. 2 is a sectional view but with the union partly in section, and showing the manner of inserting same in the pipe and the ease with which it may be applied.

Fig. 3 is another similar view showing the entire coupling in section and the pipe connected at one end the coupling not yet having been connected up.

Fig. 4 shows the improved union by itself the sleeve being in section.

Fig. 5 shows a sectional view of the ordinary flexible union in common use now.

Referring more particularly to the drawing, 1 illustrates a pipe having an elbow 2 and an elbow 3, the pipe being assumed to be mounted or in use.

By referring to Fig. 1 it will be seen that in order to place the T 4 in the pipe 1, that said pipe must first be cut. Assuming the pipe to have been cut at the proper point and then removed from the elbows 2 and 3 in order to properly screw the T 4 onto that portion of the pipe 1 indicated at A. The balance of the pipe 1 extending to the elbow 2 must then be placed, that is connected to the T 4 and the elbows 2. Now inasmuch as the elbows are usually fixed in position, it is practically impossible to spring the pipe enough to allow the remainder of it to be fastened properly to the T 4 and the elbow 2. So it is the custom for the fitter to insert a flexible union such as shown in Fig. 5, or some other suitable fitting of the ordinary construction such as a right and left coupling or the like in the pipe 1 between the elbow 2 and the T 4. To do this the pipe is cut again at the point of inserting the union and thereby divided into the pieces B and C. One side of the union is then fastened to the piece B, and the other to piece C by springing the pipe out of alinement, to allow the thread to enter L 2 to take hold. It will be noted also in the particular fitting such as the union shown in Fig. 5 that said union is flexible on the movable ground joint. This is very often a most difficult job and is a disadvantage which this invention overcomes.

For the purpose of best describing my invention we will assume that the T 4 has already been inserted in the pipe 1 and the portion A is mounted in the elbow 3. And we will also assume that the portion B of the pipe 1 has been screwed into the T 4 as shown in Fig. 2, the ends of all the portions or sections of pipes A, B, and C having been threaded properly, and of course the pipe having been cut at the point at which the union is to be inserted.

That portion of the pipe 1 shown at C is then gaged in length as shown in Fig. 2 and the ends then threaded at 5 and 6. The coupling member 7 is then screwed on the threads 6 before the pipe C is in place, and the coupling or union sleeve 8 is first placed on the coupling member 7. After this is accomplished the coupling member 9 must be placed on the pipe section B, pipe B being threaded at 10 to receive same. When this has been done the pipe C is ready to be placed in position and by referring to Fig. 2 it is seen just what position the pipe will assume, and it will be evident that no springing of the pipe will be necessary. Now the threads 5 on pipe C are screwed into the elbow 2 bringing pipe C into the position shown in Fig. 3. After this is accomplished the coupling sleeve 8 is screwed into the position shown in Figs. 1 and 4, where it is also seen that the ground portions 11 and 12 on the coupling sleeve and coupling member 7 respectively, engage each other making a tight and secure fitting and one which cannot work loose and wear out as in the ordinarily constructed union.

Referring to Fig. 5, the old construction is shown and it will be noted that the ground joint 15 is a little flexible when the union is loose, and when tightened it is always subject to a little wear and soon destroys the tight fit and renders the union useless, in fact, in certain kinds of work the unions made in this fashion are not allowed to be used, due to its liability of becoming loosened.

With my improved union in use, this disadvantage is overcome, and also those disadvantages of installing unions, and my union also forms a safe, tight fitting, rigid and durable union for all purposes.

Thus it is seen that my improved union can be used to the same advantage as the present flexible union, flange union, right and left coupling, etc., that are now in use.

What I claim as new and desire to secure by Letters Patent is:

A pipe coupling adapted to be interposed between two pipe members without distorting the latter comprising two externally and internally threaded terminal members and an internally threaded sleeve adapted to be mounted on one of said members, said sleeve having a reduced opening at one end and an inclined annular wedge surface therearound, a similar inclined annular wedge surface at the rear of the terminal member upon which the sleeve is to be mounted, said terminal members adapted to be screwed in spaced relation upon opposing ends of pipe members, said sleeve being adapted to screw upon both terminal members and to bridge the space between them, the said wedge surfaces being adapted to engage each other to prevent leakage.

JOHN J. DELEHANTY.

Witnesses:
 LEANDER D. OLIVER,
 HARRY BRUNNER.

Copies of this patent may be obtained for five cents each, by addressing the "Commissioner of Patents, Washington, D. C."